US010438267B2

(12) United States Patent
Yonaha et al.

(10) Patent No.: US 10,438,267 B2
(45) Date of Patent: Oct. 8, 2019

(54) PRODUCT SEARCH DEVICE, SYSTEM, METHOD, AND PROGRAM WHICH USES FIRST AND SECOND DIFFERENT FEATURES OF PRODUCTS TO DISPLAY AND SEARCH THE PRODUCTS

(71) Applicant: FUJIFILM Corporation, Tokyo (JP)

(72) Inventors: Makoto Yonaha, Tokyo (JP); Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 405 days.

(21) Appl. No.: 15/207,884

(22) Filed: Jul. 12, 2016

(65) Prior Publication Data
US 2016/0321733 A1 Nov. 3, 2016

Related U.S. Application Data

(63) Continuation of application No. PCT/JP2015/051246, filed on Jan. 19, 2015.

(30) Foreign Application Priority Data

Feb. 28, 2014 (JP) .................................. 2014-038526

(51) Int. Cl.
G06Q 30/06 (2012.01)
G06F 16/583 (2019.01)
G06F 16/54 (2019.01)

(52) U.S. Cl.
CPC ......... G06Q 30/0629 (2013.01); G06F 16/54 (2019.01); G06F 16/5838 (2019.01);
(Continued)

(58) Field of Classification Search
CPC .... G06F 17/30; G06F 17/30256; G06F 16/54; G06F 16/5838; G06Q 30/06–0645; G06Q 30/08
See application file for complete search history.

(56) References Cited

U.S. PATENT DOCUMENTS 8,112,317 B1* 2/2012 Ballaro ................ G06Q 10/087
705/26.1
2012/0054060 A1* 3/2012 Kundu ............... G06Q 30/0603
705/26.5
(Continued)

FOREIGN PATENT DOCUMENTS

EP 2518641 A1 10/2012
JP 08-249352 A 9/1996
(Continued)

OTHER PUBLICATIONS

Huang, "Retrieving interesting images using fuzzy image segmentation and fuzzy data mining model," IEEE Annual Meeting of the Fuzzy Information, 2004. Processing NAFIPS '04. IEEE, Jun. 27-30, 2004, Banff, Alberta, Canada. pp. 623-628. (Year: 2004).*
(Continued)

Primary Examiner — Adam L Levine
(74) Attorney, Agent, or Firm — Studebaker & Brackett PC

(57) ABSTRACT

The present invention provides a product search device, system, method and program capable of causing a customer who searches for products to be confident that even if more products are searched for, there will be no better products. In a preferred aspect of the present invention, a representative design selection unit receives an instruction to select a desired representative design via a user interface of an information terminal or directly. A first display image search and formation unit searches for products adopting the selected representative design from a product database and creates first product list data. A product image selection unit receives an instruction to select a desired product from the first product list data. A second display image search and formation unit searches for products having a second feature amount near a second feature amount of the selected product from the product database and creates second product list data.

11 Claims, 7 Drawing Sheets

(52) U.S. Cl.
CPC ..... *G06Q 30/0601* (2013.01); *G06Q 30/0627* (2013.01); *G06Q 30/0643* (2013.01)

(56) References Cited

U.S. PATENT DOCUMENTS

| | | | | |
|---|---|---|---|---|
| 2012/0246029 A1* | 9/2012 | Ventrone | ................ | G06Q 30/06 705/26.63 |
| 2014/0258043 A1* | 9/2014 | McCabe | ............ | G06Q 30/0627 705/26.64 |
| 2015/0089380 A1* | 3/2015 | Glidden | .............. | G06F 17/5004 715/739 |
| 2015/0121309 A1* | 4/2015 | Reed | .................. | G06Q 30/0241 715/824 |

FOREIGN PATENT DOCUMENTS

| | | |
|---|---|---|
| JP | 2001-109804 A | 4/2001 |
| JP | 2002-236823 A | 8/2002 |
| JP | 2009-251850 A | 10/2009 |
| JP | 2012-108721 A | 6/2012 |

OTHER PUBLICATIONS

Huang, "A fuzzy feature clustering with relevance feedback approach to content-based image retrieval," IEEE International Symposium on Virtual Environments, Human-Computer Interfaces and Measurement Systems, 2003. VECIMS '03. IEEE, Jul. 27-29, 2003, Lugano, Switzerland; pp. 57-62. (Year: 2003).*

International Search Report issued in PCT/JP2015/051246; dated Apr. 21, 2015.

Written Opinion issued in PCT/JP2015/051246; dated Apr. 21, 2015.

The extended European search report issued by the European Patent Office dated Dec. 9, 2016, which corresponds to European Patent Application No. 15754793.6-1955 and is related to U.S. Appl. No. 15/207,884.

An Office Action issued by the Chinese Patent Office dated Jan. 25, 2019, which corresponds to Chinese Patent Application No. 201580010269.0 and is related to U.S. Appl. No. 15/207,884; with English language translation.

A Summons to Attend Oral Proceedings issued by the European Patent Office on May 8, 2019, which corresponds to European Patent Application No. 15754793.6 and is related to U.S. Appl. No. 15/207,884.

* cited by examiner

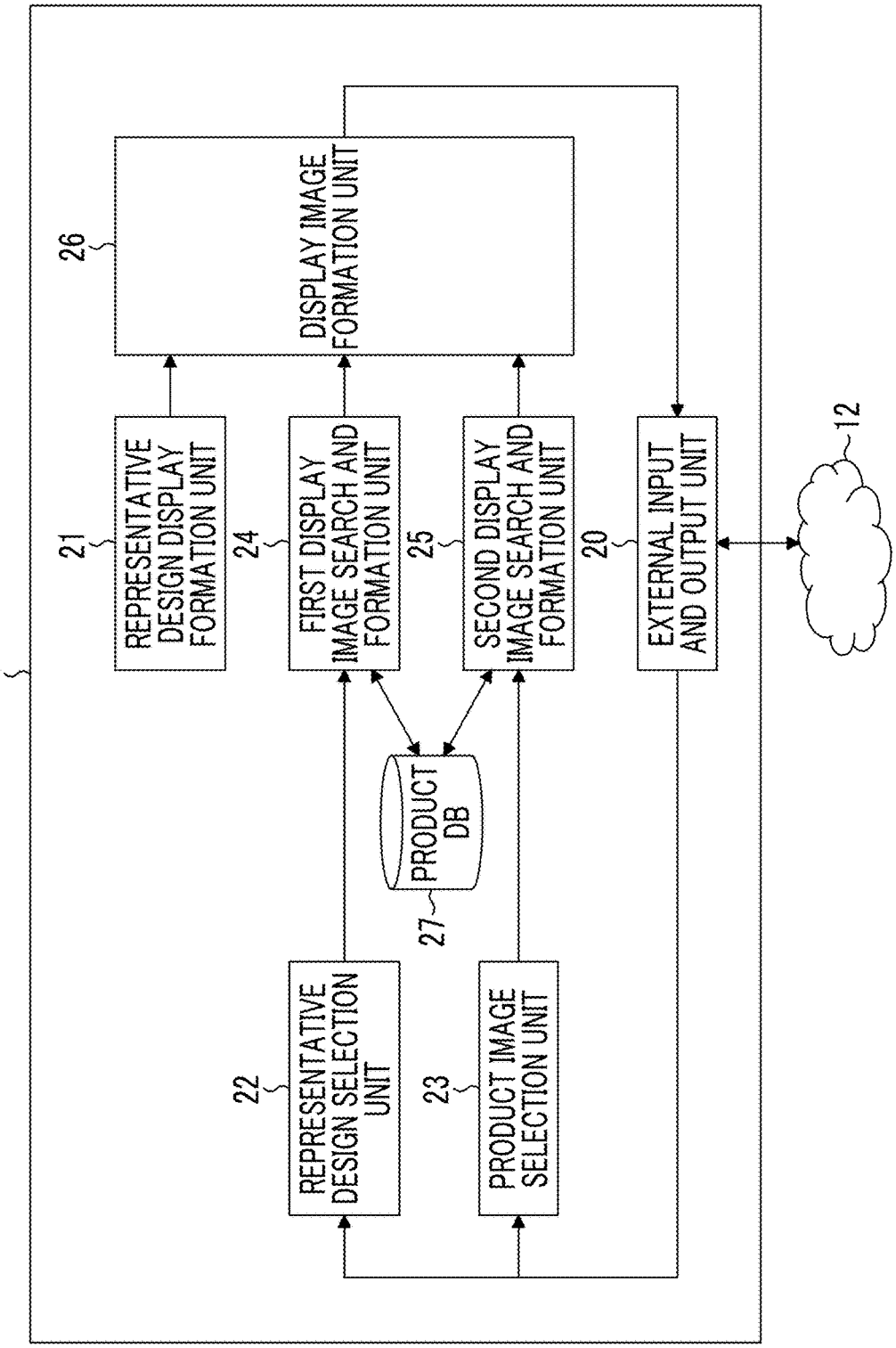

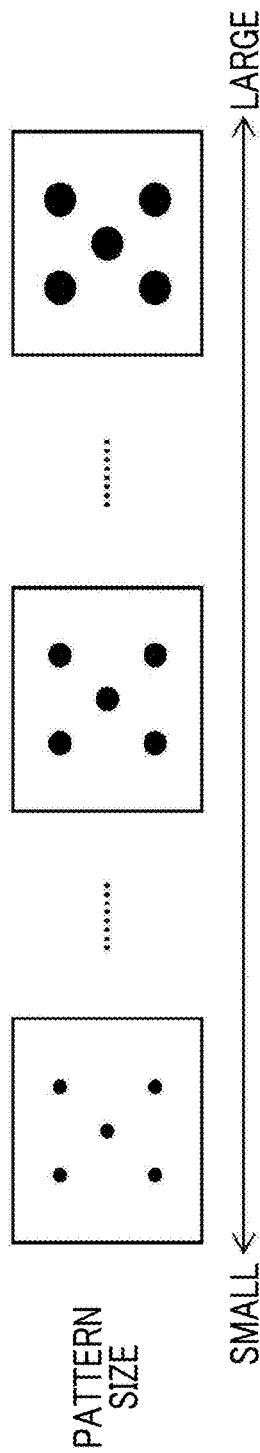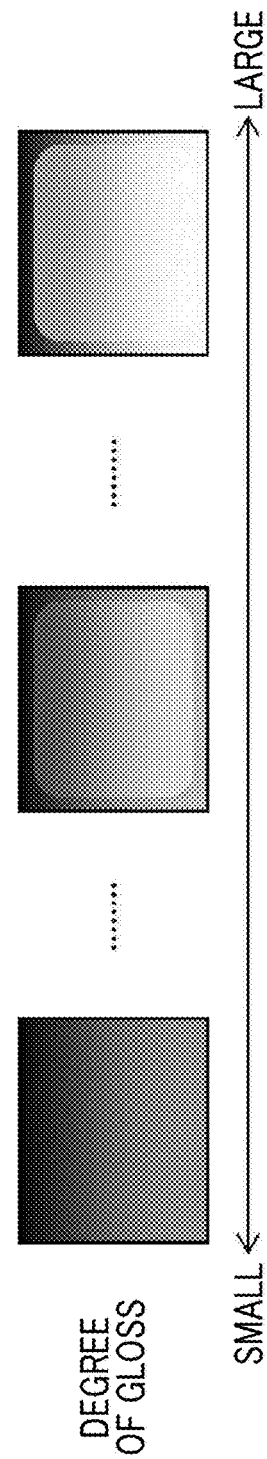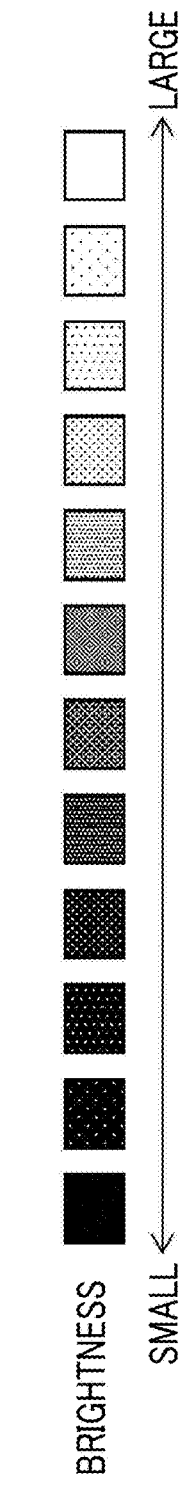

PRODUCT SEARCH DEVICE, SYSTEM, METHOD, AND PROGRAM WHICH USES FIRST AND SECOND DIFFERENT FEATURES OF PRODUCTS TO DISPLAY AND SEARCH THE PRODUCTS

CROSS-REFERENCE TO RELATED APPLICATIONS

This application is a Continuation of PCT International Application No. PCT/JP2015/051246 filed on Jan. 19, 2015, which claims priority under 35 U.S.C. § 119(a) to Japanese Patent Application No. 2014-038526 filed on Feb. 28, 2014. Each of the above applications is hereby expressly incorporated by reference, in their entirety, into the present application.

BACKGROUND OF THE INVENTION

1. Field of the Invention

The present invention relates to a product search device, system, method, and program. Particularly, the present invention relates to a device, system, method, and program for product searching in an electronic commerce market.

2. Description of the Related Art

An image search device described in JP2012-108721A stores each of pieces of image data in association with color arrangement sense score data corresponding to a color arrangement sense language (including sensibility words), sorts the image data in descending order according to the color arrangement sense score data corresponding to the color arrangement sense language if the color arrangement sense language is input, and extracts and displays upper image data.

JP1996-249352A (JP-H08-249352A) describes that product images mapped on coordinates having two feature amounts including a physical feature amount and a sensibility feature amount as coordinate axes, which are a plurality of product images having a similar feature amount around a value of a user-designated feature amount, are searched for, and the plurality of product images that have been searched for are displayed. That is, if an intersection (desired image position) on the coordinates is designated by a vertical-axis cursor position and a horizontal-axis cursor position, a search area having a predetermined extendable and reducible shape is set around the desired image position, an image group in the search area is searched for, and the image group that has been searched for is displayed.

SUMMARY OF THE INVENTION

In JP2012-108721A, image data is sorted according to the color arrangement sense score data and upper image data is extracted and displayed, but an entire feeling of the product cannot be recognized from the upper image data. Further, JP2012-108721A does not disclose a function or a technology for performing guidance to a product that further satisfies the preferences of a user from the extracted and displayed image data.

In JP1996-249352A (JP-H08-249352A), a plurality of product images having a similar feature amount around a value of a user-designated feature amount are searched for and the plurality of product images that have been searched for are displayed, but an entire feeling of the product cannot be recognized from the plurality of product images having the similar feature amount. Further, searching for products having the similar feature amount designated by the user is not efficient in a case in which products according to the preference of a user are searched for from enormous product images.

The present invention has been made in view of such problems, and an object thereof is to provide a product search device, system, method and program capable of increasing sales in electronic commerce by causing a customer who searches for products in an electronic commerce market to be confident that "even if more products are searched for, there will be no better products".

To solve the above problem, a first aspect of the present invention provides a product search device, comprising: representative design output means for creating data for displaying, side by side, representative designs that are samples of designs adopted in a plurality of respective products according to a first feature amount regarding the designs of the plurality of products, and outputting the data; representative design selection means for receiving a selection of a desired representative design from the representative designs in the data output by the representative design output means; representative product search means for searching for a product adopting a design corresponding to the selected representative design from among the plurality of products; representative product data output means for creating data for displaying the products searched for by the representative product search means, and outputting the data; product selection means for receiving a selection of a desired product from the products in the data output by the representative product data output means; and nearby product search means for searching for a product having a second feature amount near a second feature amount of the selected product from among the plurality of products, based on the second feature amount for the design of the selected product and the second feature amount for the designs of the plurality of products, wherein the second feature amount is different from the first feature amount.

According to the present invention, a user can select a favorite representative design from the representative designs arranged according to the first feature amount, and search for a product having a second feature amount near a second feature amount of the product adopting the selected representative design. Since the second feature amount is different from the first feature amount, the user can recognize a product of the design close to the selected product from, as an axis, a feature amount different from the feature amount on which the representative designs are arranged. Therefore, it is possible to efficiently search for a product of a favorite design from a large number of products.

In a second aspect of the present invention, the nearby product search means searches for a product of a design in a range of a specific second feature amount around the second feature amount of the design of the selected product.

According to the invention, products of designs in a specific range around the design of the selected product are searched for according to the second feature amount. Accordingly, products of the design close to the design of the selected product are searched for.

In a third aspect of the present invention, the representative design is at least one of samples of color, pattern, texture, or shape.

According to the invention, a user can select a desired representative design from among at least one of the samples of color, pattern, texture, or shape.

In a fourth aspect of the present invention, the representative design is a sample of a color, and the first feature amount is any one of chroma, brightness, hue, and tone.

According to the invention, the user can select a desired representative design from among the representative designs that are samples of the color arranged according to any one of the chroma, the brightness, the hue, and the tone.

In a fifth aspect of the present invention, the representative design is a sample of a pattern, and the first feature amount is any one of a size of a pattern, a density of the pattern, and the number of colors of the pattern.

According to the invention, a user can select a desired representative design from representative designs that are samples of the pattern arranged according to any one of a size of a pattern, a density of the pattern, and the number of colors of the pattern.

In a sixth aspect of the present invention, the representative design is a sample of texture, and the first feature amount is any one of a degree of gloss and a degree of transparency.

According to the invention, a user can select a desired representative design from representative designs that are samples of the texture arranged according to any one of a degree of gloss and a degree of transparency.

In a seventh aspect of the present invention, the second feature amount is at least one of chroma, brightness, hue, tone, a size of a pattern, a density of the pattern, the number of colors of the pattern, a degree of gloss, or a degree of transparency, the at least one being different from the first feature amount.

In an eighth aspect of the present invention, the nearby product search means searches for a product having a chroma, brightness, hue, or tone near chroma, brightness, hue, or tone of the selected product.

In a ninth aspect of the present invention, the nearby product search means searches for a product having a size of the pattern, a density of the pattern, or the number of colors of the pattern near a size of the pattern, a density of the pattern, or the number of colors of the pattern of the selected product.

In a tenth aspect of the present invention, the nearby product search means searches for a product having a degree of gloss or a degree of transparency near the degree of gloss or the degree of transparency of the selected product.

In an eleventh aspect of the present invention, the product search device further comprises a near product output means for creating data for displaying the products searched for by the nearby product search means side by side near the selected product according to the second feature amount and outputting the data.

A twelfth aspect of the present invention provides a product search system, comprising: the product search device according to the eleventh aspect; a representative design display means for displaying the data output by the representative design output means; representative design selection operation output means for receiving an operation to select a desired representative design from the representative designs in the data displayed by the representative design display means, and outputting a result of selection according to the operation to the representative design selection means; representative product data display means for displaying the data output by the representative product data output means; product selection operation output means for receiving an operation to select a desired product from the products in the data displayed by the representative product data display means, and outputting a result of selection according to the operation to the product selection means; and nearby product display means for displaying the data output by the nearby product output means.

A thirteenth aspect of the present invention provides a product search method executed by a computer, the method comprising: a representative design output step of creating data for displaying, side by side, representative designs that are samples of designs adopted in a plurality of respective products according to a first feature amount regarding the designs of the plurality of products, and outputting the data; a representative design selection step of receiving a selection of a desired representative design from the representative designs in the output data; a representative design-corresponding product search step of searching for a product adopting a design corresponding to the selected representative design from among the plurality of products; a representative design-corresponding product search data output step of creating data for displaying the products searched for, and outputting the data; a product selection step of receiving a selection of a desired product from the products in the output data; a nearby product search step of searching for a product having a second feature amount near a second feature amount of the selected product from among the plurality of products, based on the second feature amount for the design of the selected product and the second feature amount for the designs of the plurality of products; and a nearby product search data output step of creating data for displaying the search products side by side near the selected product according to the second feature amount, and outputting the data, wherein the second feature amount is different from the first feature amount.

A fourteenth aspect of the present invention provides a program for causing a computer to execute the product search method according to the thirteenth aspect. This program can be recorded in a nonvolatile memory, a memory card, a USB memory, a CD-ROM, a DVD-ROM, a Blu-ray disc, a hard disk, or various other computer-readable non-transitory recording media.

According to the present invention, since the products adopting the design which corresponds to the representative design selected from among the representative designs displayed side by side according to the first feature amount are searched for, and the data for displaying the products that have been searched for is output, a user can recognize an entire feeling (assortment) of the product by selecting the representative design. Further, according to the present invention, since the products of the second feature amount near the second feature amount regarding the design of the product selected from among the products that have been searched for are searched for and the data for displaying the list of the images of the products side by side according to the second feature amount different from the first feature amount is output, the user can select a most desired product from a product group in a range of interest.

BRIEF DESCRIPTION OF THE DRAWINGS

FIG. 2 is a diagram illustrating a configuration of a product search device.

FIGS. 3A to 3C are diagrams illustrating a list of one-dimensional representative designs.

DESCRIPTION OF THE PREFERRED EMBODIMENTS

First Embodiment

Figure 1:
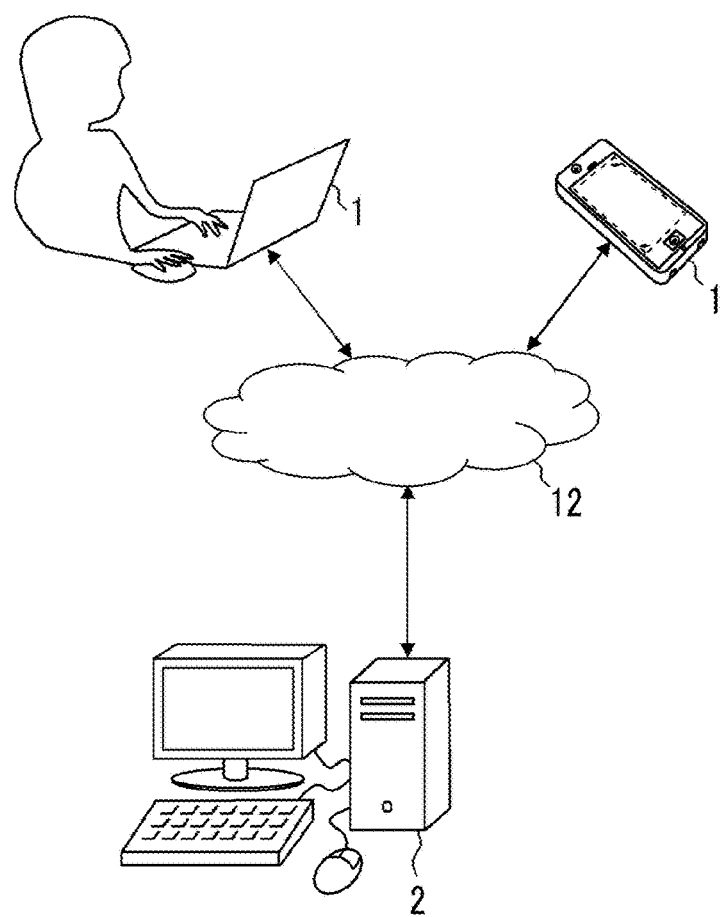
FIG. 1 is a diagram illustrating an entire configuration of a product search system.

FIG. 1 illustrates an entire configuration of a product search system including an information terminal 1 and a product search device 2 according to a preferred embodiment of the present invention. The information terminal 1 is configured as an information processing apparatus including a computing unit (CPU), a display device, a storage device, an input and output circuit, a communication circuit, and a user interface (for example, a graphical user interface (GUI), an operation button, or a switch) that operates in conjunction with such components. The information terminal 1 may be a desktop type personal computer, a smart television, or a non-portable device such as a shop information terminal, or may be a portable device with a display, such as a smartphone, a portable information terminal, or a tablet PC.

An installation position or an installing person of the information terminal 1 and the product search device 2 is not particularly limited. For example, the information terminal 1 may be one owned by an individual user or may be one lent to a customer or a staff or allowed for the customer or the staff to be temporarily used from a retailer in shop product transaction. Further, the product search device 2 may be installed by a product provider or may be installed by a broker who does not directly provide products.

The display device corresponds to representative design display means, representative product data display means, and nearby product display means. Further, the communication circuit that outputs data in conjunction with a selection operation in the user interface corresponds to representative design selection operation output means and product selection operation output means.

The product search device 2 is configured as an information processing apparatus including a computing unit (CPU), a display device, a storage device, an input and output circuit, a communication circuit, and a user interface (for example, a graphical user interface (GUI), an operation button, a switch, or a touch panel) that operates in conjunction with such components.

The information terminal 1 and the product search device 2 are connected to each other via a known network 12 such as the Internet or a LAN (wired or wireless). A plurality of information terminals 1 may be connected to the product search device 2.

As illustrated in FIG. 2, the product search device 2 includes an external input and output unit 20, a representative design display formation unit 21, a representative design selection unit 22, a product image selection unit 23, a first display image search and formation unit 24, a second display image search and formation unit 25, a display image formation unit 26, and a product database 27.

The external input and output unit 20 is a circuit that performs input and output of data with respect to one or a plurality of information terminals 1 over a network 12.

The representative design display formation unit 21 is means for creating data of a list of representative designs, and corresponds to representative design output means. The representative design is a sample of a design of a product, such as a sample of color, a sample of a pattern, a sample of a texture, or a sample of a shape. Further, for example, the list of representative designs can be created by arranging samples of individual representative designs.

The representative design display formation unit 21 is assumed to create the data of the list of representative designs by arranging individual samples according to a first feature amount corresponding thereto. The first feature amount is a value that quantitatively indicates nature of the design of the individual sample.

For example, if the representative design is the sample of the color, a first feature amount that is an axis for arranging the list of samples of the color is one or more of feature amounts of a category of the color, that is, chroma, brightness, hue, and tone. Alternatively, if the representative design is a sample of the pattern, the first feature amount that is an axis for arranging the list of samples of the pattern is one or more of feature amounts of a category of the pattern, that is, a size of the pattern, a density of pattern, and the number of colors of the pattern. Alternatively, if the representative design is a sample of the texture, the first feature amount that is an axis for arranging the list of samples of the texture is one or more of feature amounts of a category of the texture, that is, a degree of gloss and a degree of transparency. Alternatively, if the representative design is a sample of the shape of the product, the first feature amount that is an axis for arranging the list of samples of the shape is a value obtained by quantifying the shape of the product, such as a width, a sleeve, a length, a free area of a neckline, an angle of a collar of a V neck, or a radius of a curvature of a U neck.

FIGS. 3A to 3C illustrate examples of lists of one-dimensional representative designs. FIG. 3A illustrates a list of samples of a size of a pattern, FIG. 3B illustrates a list of samples of a degree of gloss, and FIG. 3C illustrates a list of samples of brightness. That is, FIG. 3A illustrates that samples of the pattern from a sample with a small pattern to a sample with a large pattern are sequentially arranged from left to right. FIG. 3B illustrates that samples of the degree of gloss from a sample with a low degree of gloss to a sample with a high degree of gloss are sequentially arranged from left to right. FIG. 3C illustrates that samples of the brightness from a sample with low brightness to a sample with high brightness are sequentially arranged from left to right.

The representative design selection unit 22 is means for receiving an instruction to select a desired representative design via the user interface of the information terminal 1 or directly, and corresponds to representative design selection means.

The first feature amount may be a one-dimensional feature amount or may be a multi-dimensional feature amount such as two or more dimensional feature amount. In a case in which the first feature amount is multi-dimensional such as three or more-dimensional, in order to display a representative design on a flat display device, a representative design in which samples are virtually arranged in a multi-dimensional space is projected to a two-dimensional plane or a one-dimensional straight line and decomposed, and projections of the decomposed representative designs are displayed sequentially or simultaneously. That is, in a case in which the first feature amount is multi-dimensional such as three or more dimensional, arranging samples on a straight line along a one-dimensional coordinate axis constituting a space of the first feature amount, arranging samples in a planar manner along a two-dimensional coordinate axis constituting the first feature amount, and a combination of two or more of the above are sequentially or simultaneously displayed.

The first display image search and formation unit 24 is means for searching for, specifying, and extracting images of products adopting the selected representative design from the product database 27, and creating first product list data indicating a list of extracted images of the products, and corresponds to representative product search means.

A size and a shape of the images of the individual products constituting the first product list data are arbitrary, but it is preferable for the image of each product to have clearness such that adoption of the selected representative design can be visually recognized. Further, an order of arranging the images of individual products constituting the first product list data is not particularly limited.

The product image selection unit 23 is means for receiving an instruction to select the image of a desired product from the first product list data via the user interface of the information terminal 1 or directly, and corresponds to product selection means.

The second display image search and formation unit 25 is means for searching for, specifying, and extracting images of products having a second feature amount close to a second feature amount corresponding to the selected image of the product from the product database 27, and creating second product list data in which respective extracted images of the products are arranged according to the corresponding second feature amount, and corresponds to nearby product search means.

The second feature amount is arbitrary if the second feature amount is a different type from the first feature amount, and is a type stored in the product search device 2, or a type arbitrarily designated from the information terminal 1 or the product search device 2. Further, the second feature amount may be a one or more dimensional feature amount. For example, (1) If the first feature amount is chroma, brightness, hue, or tone, the second feature amount is at least one of a shape of the product, a size of the pattern, a density of the pattern, the number of colors of the pattern, a degree of gloss, or a degree of transparency.

(2) If the first feature amount is the size of the pattern, the density of the pattern, or the number of colors of the pattern, the second feature amount is at least one of a shape of the product, chroma, brightness, hue, tone, a degree of gloss, or a degree of transparency.

(3) If the first feature amount is the degree of gloss or the degree of transparency, the second feature amount is at least one of a shape of the product, chroma, brightness, hue, tone, a size of a pattern, a density of the pattern, or the number of colors of the pattern.

(4) If the first feature amount is a shape of a product, the second feature amount is at least one of chroma, brightness, hue, tone, a size of a pattern, a density of the pattern, the number of colors of the pattern, a degree of gloss, or a degree of transparency.

Further, "near the second feature amount" refers to a specific range around the second feature amount of the selected product. For example, [$\alpha-\beta$, $\alpha+\gamma$] ($\beta$ and $\gamma$ are positive integers) that is a range of a specific second feature amount around the second feature amount $\alpha$ is near the second feature amount $\alpha$. If $\beta=\gamma$, a boundary and the inside of a circle having a radius of $\beta=\gamma$ around the second feature amount $\alpha$ are near the second feature amount $\alpha$.

A specific example of the search of the product having the second feature amount near the selected product is as follows.

(1) If the second feature amount is the number of colors of the pattern, $\alpha=3$, and $\beta=\gamma=1$, products in which the number of colors of the pattern is 2 or 4 are searched for as products near the product in which the number of colors=3.

(2) If the second feature amount is a size of the pattern, $\alpha=1$ cm, and $\beta=\gamma=0.5$ cm, products in which the size of the pattern is 0.5 cm to 1.5 cm are searched for as products near the product in which the size of the pattern of the pattern=1 cm.

(3) If the second feature amount is a density of the pattern, $\alpha=3/cm^2$, and $\beta=\gamma=1/cm^2$, products in which the density of the pattern is $2/cm^2$ to $4/cm^2$ are searched for as products near the product in which the density of the pattern=$3/cm^2$.

(4) If the second feature amount is a curvature of a neck portion of a product (clothing), $\alpha=0.1$, and $\beta=\gamma=0.05$, products in which the curvature is 0.05 to 0.15 are searched for as products near the product in which the curvature of the neck portion=0.1.

(5) If the second feature amount is a degree of transparency, $\alpha=50$, and $\beta=\gamma=10$, products in which the degree of transparency is 40 to 60 are searched for as products near the product in which the degree of transparency=50.

(6) If the second feature amount is a degree of gloss, $\alpha=50$, and $\beta=\gamma=10$, products in which the degree of gloss is 40 to 60 are searched for as products near the product in which the degree of gloss=50.

(7) If the second feature amount is hue, $\alpha=5Y$, and $\beta=\gamma=1Y$, products in which the hue is 4Y to 6Y are searched for as products near the product in which the hue=5Y.

(8) If the second feature amount is brightness, $\alpha=5$, and $\beta=\gamma=1$, products in which the brightness is 4 to 6 are searched for as products near the product in which the brightness=5.

(9) If the second feature amount is chroma, $\alpha=5$, and $\beta=\gamma=1$, products in which the chroma is 4 to 6 are searched for as products near the product in which the chroma=5.

(10) Search based on a combination of two or more of the second feature amounts (1) to (9) is also included in the present invention. For example, if the second feature amount is a two-dimensional feature amount including the number of colors and the hue of the pattern, $\alpha=3$ and $\beta=\gamma=1$ for the number of colors of the pattern, and $\alpha=5Y$ and $\beta=\gamma=1Y$ for the hue, products in which (the number of colors of the pattern is 2 or 4) and (hue is 4Y to 6Y) are searched for as products near the product of the number of colors of the pattern=3 and hue=5Y. The combination of two or more of the second feature amounts (1) to (9) may be able to be arbitrarily designated from the information terminal 1 or the product search device 2.

The display image formation unit 26 is means for outputting the list of representative designs created by the representative design display formation unit 21, the first product list data created by the first display image search and formation unit 24, and the second product list display data created by the second display image search and formation unit 25 to the information terminal 1, and corresponds to representative design output means, representative product data output means, or nearby product output means.

Figure 4:
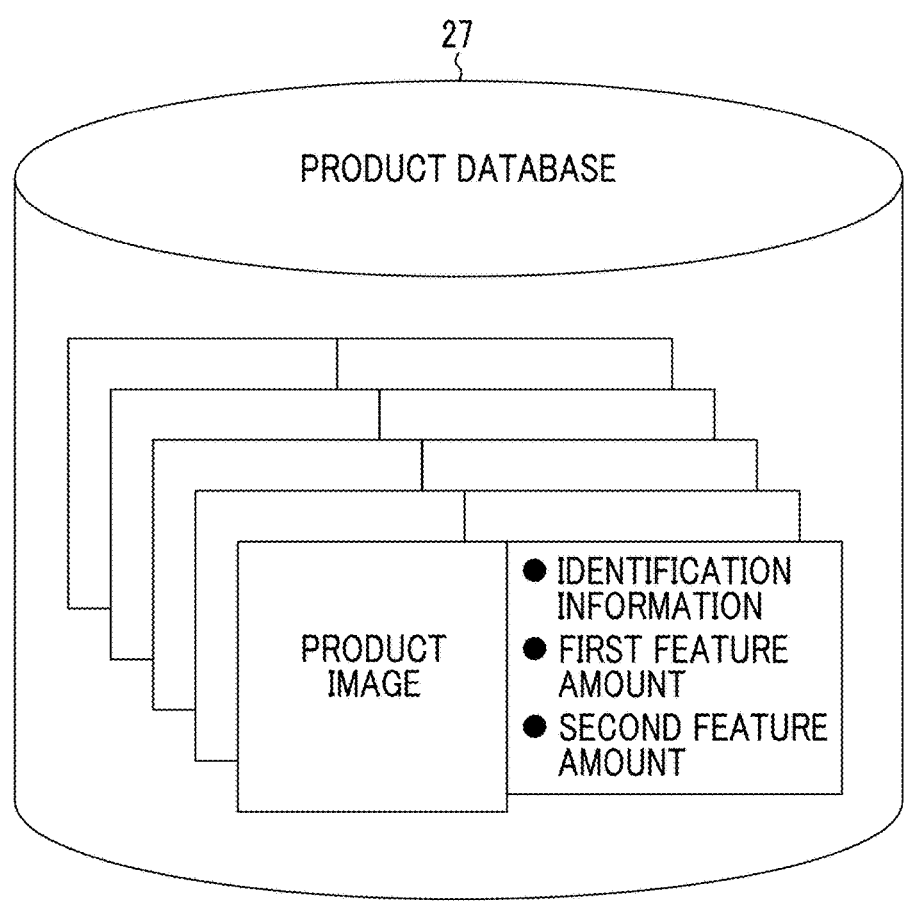
FIG. 4 is a diagram illustrating information of a product database.

As illustrated in FIG. 4, the product database 27 is means for storing the identification information, the image showing an appearance of the product, the first feature amount of the product, and the second feature amount of the product in association with one another, for each product. A method of creating the product database 27 is arbitrary.

Figure 5:
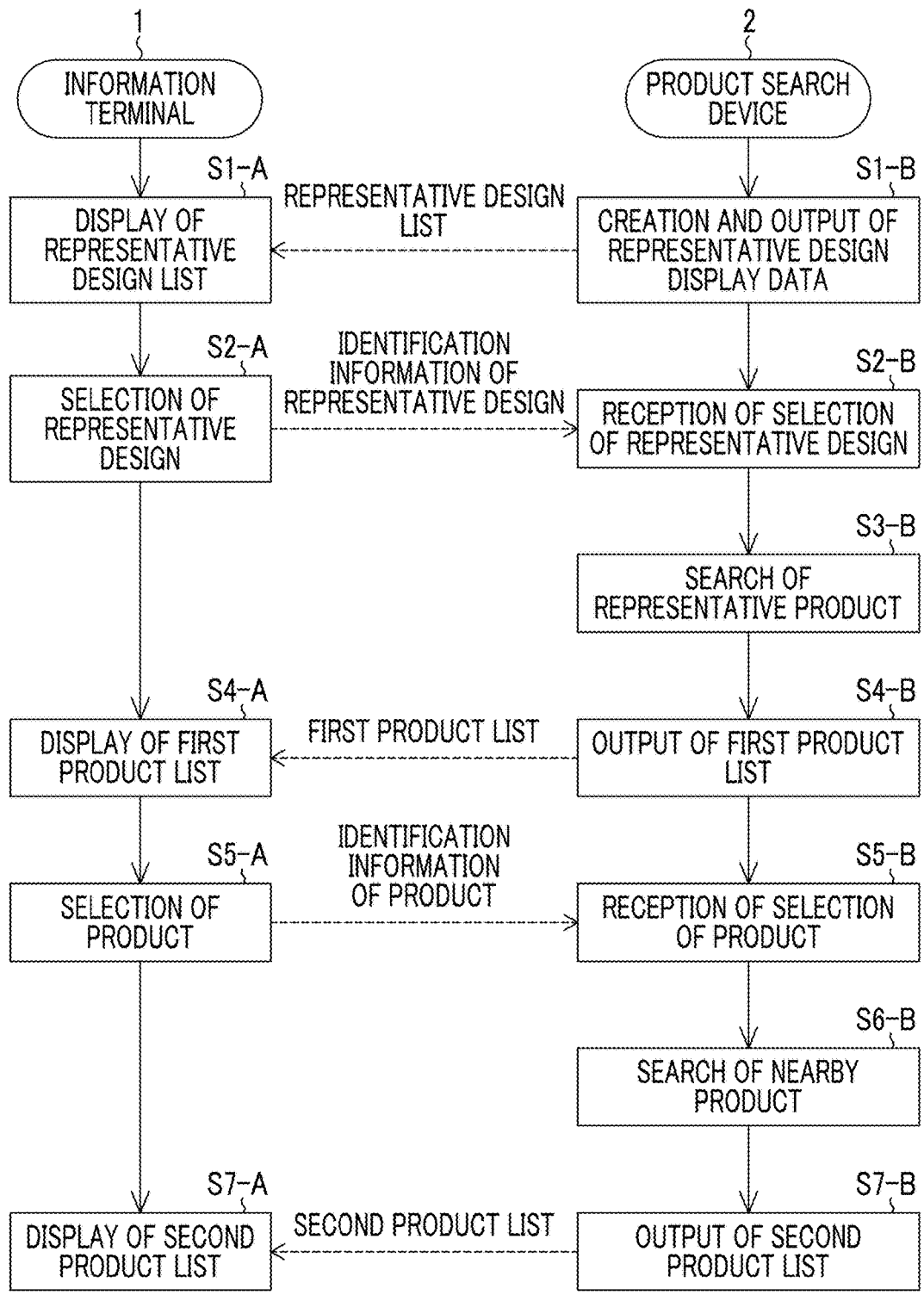
FIG. 5 is a diagram illustrating a flowchart of a search process.

FIG. 5 illustrates a flowchart of a search process according to a preferred embodiment of the present invention. If there are a plurality of information terminals 1 connected to the product search device 2, the following processes are separately performed for the plurality of information terminals 1. Further, a computer-readable non-transient recording medium in which a program for causing the information terminal 1 and the product search device 2 to execute the following processes is recorded is assumed to be a recording medium included in each of the information terminal 1 and the product search device 2.

In S1-B (representative design output step), the representative design display formation unit 21 of the product search device 2 generates a list of representative designs and outputs the list to the information terminal 1 over the network 12. A form of the output is arbitrary and may be any one of wired communication and wireless communication. Further, whether to display the list of representative designs of which category may be able to be arbitrarily selected from the user interface of the information terminal 1.

In S1-A, the information terminal 1 receives the list of representative designs output by the representative design display formation unit 21, and displays the list on the display device (representative design display means).

In S2-A, the information terminal 1 displays, for example, a message prompting the user to select a desired representative design from the list of representative designs so that the desired representative design is selected from the user interface. The communication circuit (representative design selection operation output means) of the information terminal 1 transmits the identification information of the selected representative design to the product search device 2.

In a case in which the first feature amount is a three or more dimensional feature amount, the information terminal 1 can decompose the representative design into two or less dimensional samples and sequentially display the samples on a screen. For example, in a case in which the first feature amount includes a three-dimensional parameter of hue, chroma, and brightness, the information terminal 1 first displays the samples of hue according to a list of the hue obtained by projecting a three-dimensional representative design onto a coordinate axis of the hue. In a case in which a desired sample is selected from the samples of the hue, the information terminal 1 then displays samples of two-dimensional color including brightness and chroma using the selected hue as an origin according to a list of brightness and chroma obtained by projecting the three-dimensional representative design onto coordinate axes of brightness and chroma.

In S2-B (representative design selection step), the representative design selection unit 22 of the product search device 2 identifies the selected representative design from the identification information of the representative design designated via the user interface of the information terminal 1, and receives the selection of the desired representative design.

In S3-B (representative design-corresponding product search step), the first display image search and formation unit 24 of the product search device 2 searches for, specifies and extracts a product adopting the selected and indicated representative design from the product database 27. That is, the first display image search and formation unit 24 collates the first feature amount of the selected and indicated representative design with the first feature amount of the product database 27, specifies identification information of the product corresponding to the first feature amount that is the same as (or similar to) the first feature amount of the selected and indicated representative design, and extracts, for example, the image, the first feature amount, and the second feature amount of the product corresponding to the identification information of the product.

In S4-B (representative design-corresponding product search data output step), the display image formation unit 26 creates first product list data for displaying a list of extracted images of the products, and outputs the first product list data to the information terminal 1.

In S4-A, the information terminal 1 displays the first product list data on the display device (representative product data display means).

In S5-A, the information terminal 1 displays, for example, a message prompting the user to select the image of the desired product from the images of the products of the first product list data so that the desired product is selected from the user interface. The communication circuit (product selection operation output means) of the information terminal 1 transmits the identification information corresponding to the image of the selected product to the product search device 2.

In S5-B (product selection step), the product image selection unit 23 of the product search device 2 receives the identification information of the product transmitted from the information terminal 1. The product image selection unit 23 determines that this identification information is the selected product.

In S6-B (nearby product search step), the second display image search and formation unit 25 of the product search device 2 searches for and extract the image of the product having the second feature amount near the second feature amount corresponding to the identification information of the selected product from the product database 27. That is, the second display image search and formation unit 25 collates the second feature amount of the selected product with the second feature amount of the product database 27, and specifies the second feature amount near the second feature amount of the selected product from the product database 27. The second display image search and formation unit 25 extracts, for example, the image of the product of the specified second feature amount, and the second feature amount.

In S7-B (nearby product search data output step), the second display image search and formation unit 25 of the product search device 2 create second product list data for arranging the extracted images of the products according to the corresponding second feature amount and displaying the list of the images. The display image formation unit 26 outputs the second product list data to the information terminal 1.

In S7-A, the information terminal 1 displays the second product list data on the display device. Then, a process regarding reservation, purchase, and shipping of the product corresponding to the image arbitrarily selected from the second product list data can be performed between the information terminal 1 and the product search device 2, similar to known electronic commerce.

Figure 6:
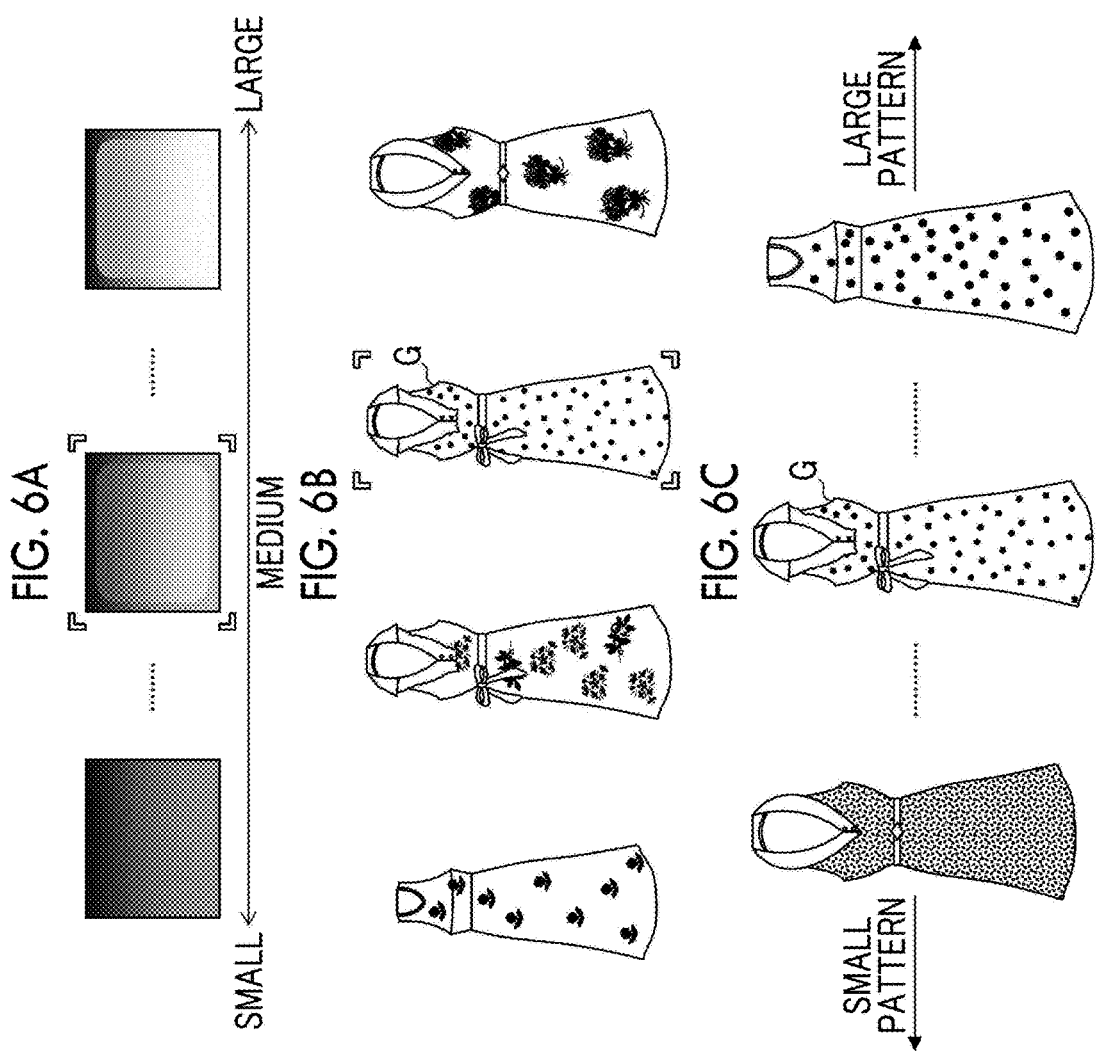
FIGS. 6A to 6C are diagrams illustrating a list in which products near an arbitrarily selected product are arranged on a straight line around the product among products adopting an arbitrarily selected representative design according to a magnitude of a second feature amount different from a first feature amount.

FIGS. 6A to 6C illustrate examples of representative design list data, first product list data, and second product list data. As illustrated in FIG. 6A, for example, the representative design of which the "degree of gloss" is "medium" is selected from among the representative designs arranged along the first feature amount a "degree of gloss". In this case, the first product list data indicating products of which the "degree of gloss" is "medium" is displayed as illustrated in FIG. 6B. Further, if a product indicated by reference sign G is arbitrarily selected from the first product list data, second product list data in which images of products having the "size of the pattern" near the product G are arranged on a straight line according to a magnitude of the second feature amount "size of the pattern" different from the "degree of gloss" around the product G arbitrarily selected from among the products of which the "degree of gloss" is "medium" is displayed, as illustrated in FIG. 6C.

When all representative designs or images of products are not included in one screen due to a problem such as a size of the display device of the information terminal 1, representative designs or the images of products may be sequentially replaced and displayed according to a flick operation in an axial direction of the first feature amount or the second feature amount.

Figure 7:
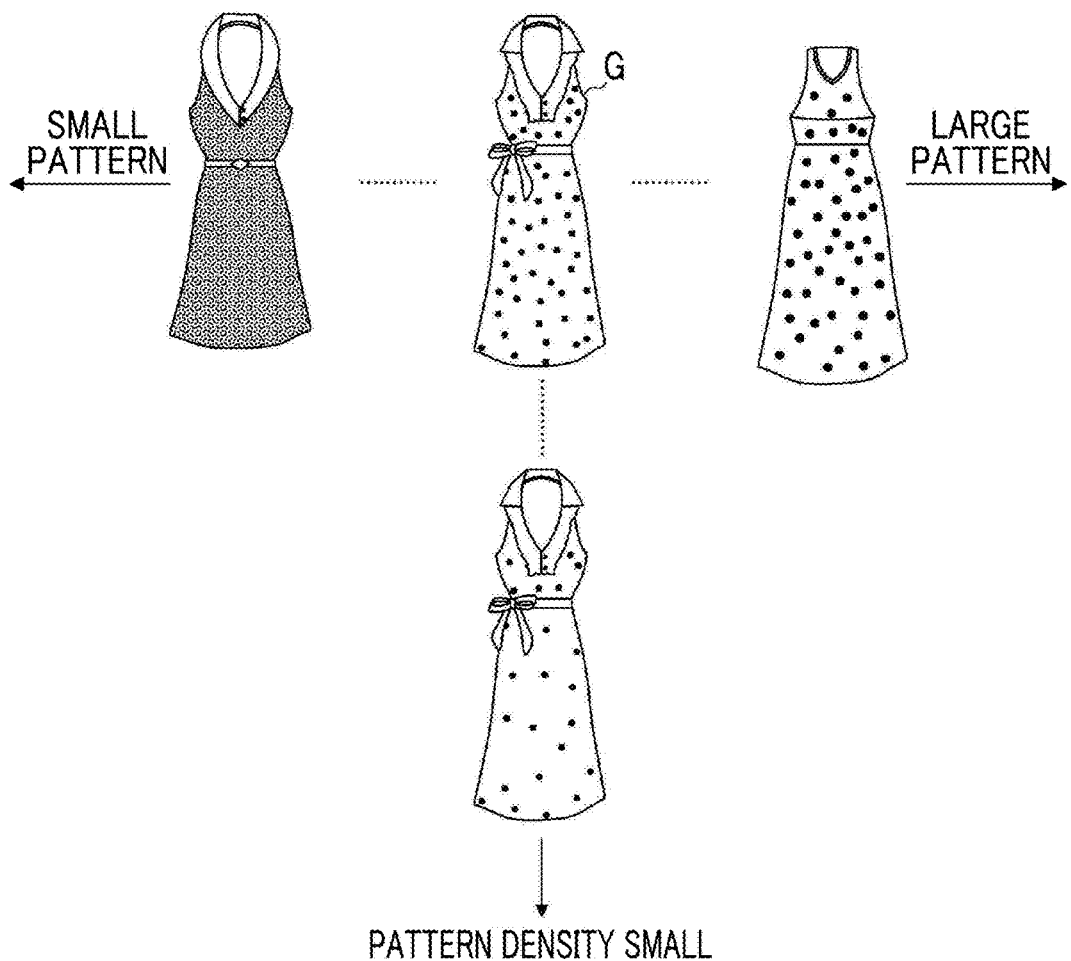
FIG. 7 is a diagram illustrating a list in which products near a product adopting an arbitrarily selected representative design are arranged in a matrix form around the product according to a magnitude of a second feature amount (a two-dimensional feature amount including a size of a pattern and a density of the pattern) different from a first feature amount.

FIG. 7 illustrates another example of the second product list data. That is, the second product list data in FIG. 7 is a list in which nearby products are arranged in a matrix form around the arbitrarily selected product G according to the magnitude of the second feature amount "size of the pattern and density of the pattern". The one-dimensional second product list data in FIG. 6C and the two-dimensional second product list data in FIG. 7 may be switched to each other and displayed according to a switching operation for the information terminal 1.

As described above, the product search device 2 of this embodiment searches for products adopting the design corresponding to the representative design arbitrarily selected from among the representative designs displayed side by side according to the first feature amount, and outputs the first product list data for displaying the products that have been searched for. A customer can recognize an entire feeling (assortment) of the products adopting the representative design from the first product list data output through the selection of the representative design. Further, the product search device 2 searches for the image of the product having the second feature amount near the product arbitrarily selected from the first product list data, and outputs the second product list data for displaying, side by side, the images of the products according to the second feature amount different from the first feature amount. The customer can receive the presentation of the products similar to the selected product from the point of view of the designs in a category different from the representative design by viewing the second product list data, and can efficiently find out favorite products in comparison with a case in which a large number of products are presented using designs in one category as a key. Further, it is possible to select a most desired product from among the images of the products in the second product list data.

Second Embodiment

The first feature amount or the second feature amount may not be limited to a physical amount that is measured and extracted from the product itself, and may be a value that is conveniently assigned to each product.

For example, coordinates of a sensibility word corresponding to a design (for example, color, shape, pattern, or texture) of an individual product in a sensibility space defining coordinates of each sensibility word may be used as one of the first feature amount and the second feature amount of the first embodiment.

The sensibility space includes axes of one or more sensibility feature amounts indicating a measure of sensibility, such as "brightness" or "beauty". Coordinates corresponding to various sensibility words such as "sober", "cute", or "crisp" are assumed to have been defined on this sensibility space. The coordinates of the sensibility word can be defined using a variety of schemes, such as a statistical survey. Further, in the individual products, assignment of the sensibility word corresponding to the design of the product is assumed to be defined. For example, "sober" is assigned to a beige product, and "cute" is assigned to a pink product.

In this case, for example, if the representative designs of the samples of hue are arranged according to the hue, the hue of the selected representative design is beige, and the sensibility word on the sensibility axis "brightness" corresponding to the arbitrarily selected product among products adopting the hue of the beige is "sober", products corresponding to "frugal", "conservative", and "plain" that are sensibility words defined at nearby coordinates of "sober" on the sensibility axis "brightness" are searched for as products near the selected product, and the second product list data including product images arranged along the sensibility axis "brightness" can be output.

Thus, a product from which a sensibility word similar to the selected product is associated is presented to the customer according to the second feature amount (sensibility word) different from the first feature amount (hue) that is a reference of an arrangement of representative designs, and selection of the product by the customer is further promoted.

A definition of a range of the vicinity of coordinates of a certain sensibility word is arbitrary, similar to the first embodiment. The first feature amount and the second feature amount may be amounts belonging to different sensibility axes on the same sensibility space.

EXPLANATION OF REFERENCES

1: information terminal
2: product search device
20: external input and output unit
21: representative design display formation unit
22: representative design selection unit
23: product image selection unit
24: first display image search and formation unit
25: second display image search and formation unit
26: display image formation unit
27: product database

What is claimed is:
1. A product search device, comprising:
a processor configured to:
create data for displaying, side by side, representative designs that are samples of designs adopted in a plurality of respective products according to a first feature amount pertaining to a characteristic common to the designs of the plurality of products, and outputting the data to control a display to display the representative designs side by side;
receive a selection of a desired representative design from the representative designs being displayed based on the data output by the processor;
search for a product adopting a design corresponding to the selected representative design from among the plurality of products being displayed;
create data for displaying the products searched for by the processor, and outputting the data to control the display to display the products searched for by the processor;
receive a selection of a desired product from the products being displayed based on the data output by the processor;

search for a product having a second feature amount near a second feature amount of the selected product from among the plurality of products being displayed, based on the second feature amount for the design of the selected product and the second feature amount for the designs of the plurality of products, wherein the second feature amount is different from the first feature amount and pertains to a characteristic of the selected product that is different from characteristics of the plurality of products other than the selected product; and create data for displaying the product having the second feature amount and a plurality of products each having a second feature amount near the second feature amount of the selected product, and outputting the data to control the display to display, based on the data, the product having the second feature amount and, alongside of the product having the second feature amount, the plurality of products having the second feature amount near the second feature amount of the selected product while refraining from displaying the products searched for from which the second feature amount is absent.

2. The product search device according to claim 1, wherein the processor searches for a product of a design in a range of a specific second feature amount around the second feature amount of the design of the selected product.

3. The product search device according to claim 1, wherein the representative designs are at least one of samples of color, pattern, texture, or shape.

4. The product search device according to claim 3, wherein the desired representative design is a sample of a color, and
the first feature amount is any one of chroma, brightness, hue, and tone.

5. The product search device according to claim 4, wherein the second feature amount is at least one of chroma, brightness, hue, tone, a size of a pattern, a density of the pattern, the number of colors of the pattern, a degree of gloss, or a degree of transparency, the at least one being different from the first feature amount.

6. The product search device according to claim 5, wherein the processor searches for a product having chroma, brightness, hue or tone near chroma, brightness, hue, or tone of the selected product.

7. The product search device according to claim 5, wherein the processor searches for a product having a size of the pattern, a density of the pattern, or the number of colors of the pattern near a size of the pattern, a density of the pattern, or the number of colors of the pattern of the selected product.

8. The product search device according to claim 5, wherein the processor searches for a product having a degree of gloss or a degree of transparency near the degree of gloss or the degree of transparency of the selected product.

9. The product search device according to claim 3, wherein the desired representative design is a sample of a pattern, and
the first feature amount is any one of a size of a pattern, a density of the pattern, and the number of colors of the pattern.

10. The product search device according to claim 3, wherein the desired representative design is a sample of texture, and
the first feature amount is any one of a degree of gloss and a degree of transparency.

11. A product search method executed by a computer, the method comprising:
creating data, by the computer, for displaying, side by side, representative designs that are samples of designs adopted in a plurality of respective products according to a first feature amount pertaining to a characteristic common to the designs of the plurality of products, and outputting the data by the computer to control a display to display the representative designs side by side;
receiving, by the computer, a selection of a desired representative design from the representative designs being displayed based on the output data;
searching, by the computer, for a product adopting a design corresponding to the selected representative design from among the plurality of products being displayed;
creating, by the computer, data for displaying the products searched for, and outputting the data to control the display to display the products searched for by the processor;
receiving, by the computer, a selection of a desired product from the products being displayed based on the output data;
searching, by the computer, for a product having a second feature amount near a second feature amount of the selected product from among the plurality of products being displayed, based on the second feature amount for the design of the selected product and the second feature amount for the designs of the plurality of products, wherein the second feature amount is different from the first feature amount and pertains to a characteristic of the selected product that is different from characteristics of the plurality of products other than the selected product; and
creating data, by the computer, for displaying the product having the second feature amount and a plurality of products each having a second feature amount near the second feature amount of the selected product, and outputting the data to control the display to display, based on the data, the product having the second feature amount and, alongside of the product having the second feature amount, the plurality of products having the second feature amount near the second feature amount of the selected product while refraining from displaying the products searched for from which the second feature amount is absent.

* * * * *